No. 744,164. PATENTED NOV. 17, 1903.
W. S. BROWN.
ANIMAL POKE.
APPLICATION FILED AUG. 25, 1903.
NO MODEL.
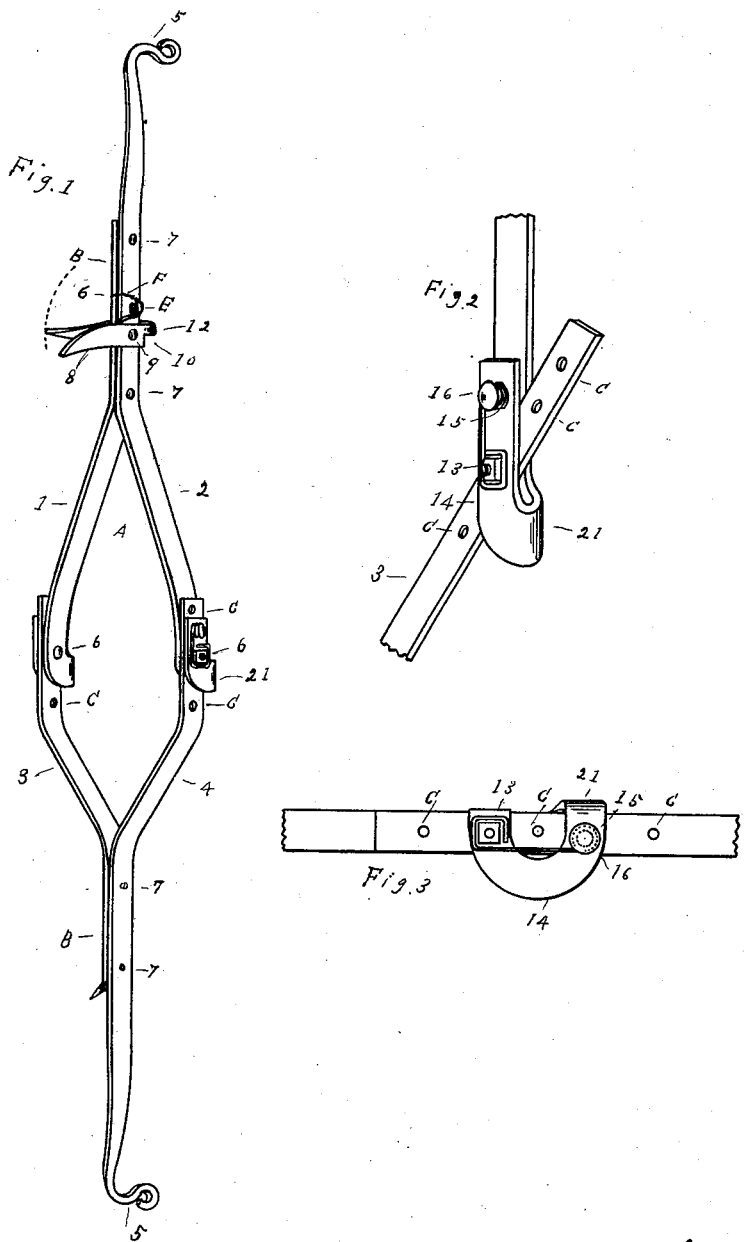
Witnesses
Paul Brown
Edwin C. Mitchell
William Stewart Brown
Inventor No. 744,164. Patented November 17, 1903.

UNITED STATES PATENT OFFICE.

WILLIAM S. BROWN, OF WICHITA, KANSAS.

ANIMAL-POKE.

SPECIFICATION forming part of Letters Patent No. 744,164, dated November 17, 1903.

Application filed August 25, 1903. Serial No. 170,738. (No model.)

*To all whom it may concern:*

Be it known that I, WILLIAM STEWART BROWN, a resident of Wichita, in the county of Sedgwick and State of Kansas, have invented certain new and useful Improvements in Animal-Pokes; and I do hereby declare the following to be a full, clear, and exact description of the invention, such as will enable others skilled in the art to which it appertains to make and use the same.

My invention relates to improvements in animal-pokes, the object of the invention being to provide improvements of this character with improved barb and improved hinge-joint for the two sections of the poke; and with this object in view the invention consists in certain novel features of construction and combinations and arrangements of parts, as will be more fully hereinafter described, and pointed out in the claims.

In the accompanying drawings, Figure 1 is a perspective view illustrating my improvements. Fig. 2 is an enlarged detail view of a hinged joint, and Fig. 3 is a slightly-modified joint.

My improved poke comprises two sections B B, composed each of two bars of flat steel, which are designated 1 2 and 3 4, respectively, secured together by rivets 7 and the longer bars of each pair terminating in hooks 5. Said bars are bowed or flared apart to receive the animal's neck and are hinged together, as will more fully hereinafter appear.

To the upper member B a U-shaped barb 8 is connected and mounted to straddle the member and is pivotally connected therewith by a rivet 9. A portion 10 of the curved portion of said barb is cut away to allow the points of the barb to swing up when hooked over a wire or other object, and thereby release itself. The remaining portion of the curve limits the downward swing of the barb by coming in contact with the member B. Contiguous to rivet 9 is a rivet E, around which a bowed spring F is mounted, the upper end of which being bent around the member B and the lower end bearing down upon barb 8 to hold it in its set position and return it to such position. To form a barb on the lower member B, the lower end of bar 3 is sharpened and bent outward, as clearly shown in Fig. 1.

The ends of bars 1 and 2 are bent upon themselves, as shown at 14, and are made with alined openings for bolts 6, having a squared portion, and the openings in the inner portions of said bent ends are made angular to receive the bolts and prevent turning thereof. The bars 3 4 are made with a series of openings C, in any of which (according to the size of the animal's neck) the bolts 6 are located to pivotally connect the members B B together. Nuts are screwed onto the outer ends of bolts 6, and spring-wires 15 are coiled at one end around rivets 16 and at their other ends are bent into angular loops 13 to encompass the nuts and prevent accidental turning thereof. To remove the poke from the animal's neck, the angular loops 13 are sprung from over the nuts and swung out of the way.

The modified form of end shown in Fig. 3 is precisely like the form above described, save that the ends are given a much wider curve.

A great many other changes might be made in the general form and arrangement of the parts described without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. An animal-poke, comprising two sections pivotally secured together, and a U-shaped barb embracing and pivotally secured to the upper poke-section, substantially as set forth.

2. An animal-poke, comprising two sections pivotally secured together, a two-point U-shaped barb embracing the upper poke-section and pivotally secured thereto, and having a portion of its curve cut away to limit the movement thereof, substantially as set forth.

3. An animal-poke, comprising two sections pivotally secured together, a U-shaped barb pivotally secured to the upper poke-section, and a spring to hold the barb in its normal position, substantially as set forth.

4. An animal-poke, comprising two sections pivotally secured together, the ends of the top section having bends or loops to embrace the ends of the lower poke-section, and a spring secured to the bend of the upper poke-section forming a nut-lock for the pivot-bolt passed through said poke-sections, substantially as set forth.

5. An animal-poke, comprising upper and lower poke-sections pivotally secured together, a U-shaped two-point barb astride and pivotally secured to the upper poke-section, the curved portion of said barb cut away to allow the points of the barb to swing up and down, and the remaining portion to limit the movement thereof, and a spring to hold the barb in its normal position, substantially as set forth.

6. An animal-poke, comprising two sections, the ends of one section bent upon themselves, bolts passing through said bent ends and having nuts thereon, and said lower section having openings therein to receive the bolts and pivot thereon, and springs secured to the bent ends and bent to encompass the nuts and form lock therefor, substantially as set forth.

WILLIAM S. BROWN.

Witnesses:
SILAS S. BROWN,
EDWIN C. MITCHELL.